US012699782B2

(12) United States Patent
Devireddy

(10) Patent No.: US 12,699,782 B2
(45) Date of Patent: Aug. 4, 2026

(54) DYNAMICALLY PROTECTING READ-ONLY FIELDS USING INTERCEPTORS AND ENCRYPTION

(71) Applicant: SAP SE, Walldorf (DE)

(72) Inventor: Veeresh Devireddy, Adoni (IN)

(73) Assignee: SAP SE, Walldorf (DE)

( * ) Notice: Subject to any disclaimer, the term of this patent is extended or adjusted under 35 U.S.C. 154(b) by 330 days.

(21) Appl. No.: 18/183,293

(22) Filed: Mar. 14, 2023

(65) Prior Publication Data

US 2024/0311494 A1 Sep. 19, 2024

(51) Int. Cl.
*G06F 21/60* (2013.01)
*G06F 21/62* (2013.01)

(52) U.S. Cl.
CPC ........ *G06F 21/602* (2013.01); *G06F 21/6218* (2013.01)

(58) Field of Classification Search
CPC ........................... G06F 21/602; G06F 21/6218
See application file for complete search history.

(56) References Cited

U.S. PATENT DOCUMENTS

| 6,526,171 | B1 * | 2/2003 | Furukawa | ........ | H04N 21/23892 |
| | | | | | 707/999.001 |
| 9,436,835 | B1 * | 9/2016 | Saldamli | ............... | G06F 21/602 |
| 9,560,026 | B1 * | 1/2017 | Worsley | .................. | H04L 63/08 |
| 10,997,301 | B1 * | 5/2021 | Rivlin | .................... | G06F 21/602 |

| 11,349,644 | B1 * | 5/2022 | Stapleton | ............ | G06F 21/6245 |
| 12,210,640 | B1 * | 1/2025 | Bin | ....................... | G06F 21/6245 |
| 2010/0031056 | A1 * | 2/2010 | Harada | .................... | G06F 21/78 |
| | | | | | 713/193 |
| 2011/0119307 | A1 * | 5/2011 | Unger | .................... | G16H 10/60 |
| | | | | | 707/705 |
| 2013/0073854 | A1 * | 3/2013 | Patti | ...................... | H04L 9/0894 |
| | | | | | 713/171 |

(Continued)

OTHER PUBLICATIONS

U.S. Appl. No. 17/839,857, Ahmed et al.

(Continued)

*Primary Examiner* — Meng Li
(74) *Attorney, Agent, or Firm* — Fish & Richardson P.C.

(57) ABSTRACT

To dynamically protect read-only fields using interceptors and encryption, application data is received from an application executing on a client computer system connected to a server computer system connected to a computer-readable database. The application data includes multiple read-only values assigned to corresponding multiple read-only data items and stored on the computer-readable database, which stores generated encrypted read-only data collectively representing an encryption of the multiple read-only values by an encryption mechanism. The received multiple read-only values are encrypted using the same encryption mechanism resulting in received encrypted read-only data. The received encrypted read-only data is compared with the generated encrypted read-only data. Based on the comparing, it is determined that the received encrypted read-only data differs from the generated encrypted read-only data. In response, an error notification is transmitted communicating a mismatch between the stored multiple read-only data values and the received multiple read-only data values.

16 Claims, 3 Drawing Sheets

(56) References Cited

U.S. PATENT DOCUMENTS

| 2014/0101261 A1* | 4/2014 | Wu ..................... H04L 12/1818 |
| | | 709/206 |
| 2017/0213041 A1* | 7/2017 | Medvedev ................ H04L 9/30 |
| 2017/0329995 A1* | 11/2017 | Benoit .................... G06F 21/64 |
| 2018/0349627 A1* | 12/2018 | Kaushik ................ H04L 9/0643 |
| 2019/0028273 A1* | 1/2019 | Harras ................. G06F 21/606 |
| 2019/0034646 A1* | 1/2019 | Fujiwara ............. H04L 63/0428 |
| 2019/0114400 A1* | 4/2019 | Lunghi ............... G06F 9/44573 |
| 2020/0184082 A1* | 6/2020 | Fu .......................... H04L 9/0894 |
| 2020/0257477 A1* | 8/2020 | Chen ..................... B41J 29/393 |
| 2021/0243193 A1* | 8/2021 | Padmanabhan ....... G06F 16/252 |
| 2021/0326456 A1* | 10/2021 | Rivlin .................... G06F 18/22 |
| 2022/0245262 A1* | 8/2022 | Khedr ................ G06F 21/6209 |
| 2022/0284088 A1* | 9/2022 | Peng ........................ G06F 21/44 |
| 2022/0374540 A1* | 11/2022 | Parks ................... G06F 21/602 |
| 2023/0006813 A1* | 1/2023 | Fox-Epstein ....... G06F 21/6245 |
| 2023/0114566 A1* | 4/2023 | Carson ..................... H04L 9/50 |
| | | 713/176 |
| 2024/0094924 A1* | 3/2024 | Kobayashi ............ G06F 3/0637 |
| 2024/0242298 A1* | 7/2024 | Mann .................... G06Q 50/14 |
| 2024/0338474 A1* | 10/2024 | Shelly ................. G06Q 10/103 |

OTHER PUBLICATIONS

Wikipedia.org [online], "Universally unique identifier" Mar. 2003, retrieved on Feb. 6, 2023, retrieved from URL <https://en.wikipedia.org/wiki/Universally_unique_identifier>, 11 pages.

* cited by examiner

DYNAMICALLY PROTECTING READ-ONLY FIELDS USING INTERCEPTORS AND ENCRYPTION

TECHNICAL FIELD

The present disclosure relates to computer-implemented methods, software and systems for ensuring integrity of data exchanged between client and server computer systems.

SUMMARY

This specification describes technologies relating to dynamically protecting read-only fields using interceptors and bi-directional encryption methods.

Certain aspects of the subject matter described here can be implemented as a computer-implemented method. Application data is received from an application executing on a client computer system connected to a server computer system connected to a computer-readable database. The application data includes multiple read-only values assigned to corresponding multiple read-only data items and stored on the computer-readable database, which stores generated encrypted read-only data collectively representing an encryption of the multiple read-only values by an encryption mechanism. The received multiple read-only values are encrypted using the same encryption mechanism resulting in received encrypted read-only data. The received encrypted read-only data is compared with the generated encrypted read-only data. Based on the comparing, it is determined that the received encrypted read-only data differs from the generated encrypted read-only data. In response to determining that the received encrypted read-only data differs from the generated encrypted read-only data, an error notification is transmitted communicating a mismatch between the stored multiple read-only data values and the received multiple read-only data values.

An aspect combinable with any other aspect includes the following features. Before receiving the application data, the generated encrypted read-only data is generated. To do so, multiple read-only data items are identified from the computer-readable database. The multiple read-only values are identified for the corresponding multiple identified read-only data items. The identified multiple read-only values are encrypted using the encryption mechanism.

An aspect combinable with any other aspect includes the following features. A read request is received from the application. In response to receiving the read request, the multiple read-only values and the generated encrypted read-only data are transmitted to the client computer system.

An aspect combinable with any other aspect includes the following features. To encrypt the identified multiple read-only values using the encryption mechanism, a universally unique identifier (UUID) is attached to the multiple read-only values. A hash value is determined for the multiple read-only values and the UUID. A secured object, which includes the multiple read-only values, the UUID and the hash value. The secured object is encoded to generate an obfuscated data object.

An aspect combinable with any other aspect includes the following features. The application data is received in a first instance. In a second instance different from the first instance, the application data including the multiple read-only values assigned to the corresponding multiple read-only data items and stored on the computer-readable database, are received. With the application data, a write request to write a data value to the writeable data item stored on the computer-readable database is received. The received multiple read-only values are encrypted using the same encryption mechanism resulting in received encrypted read-only data. The received encrypted read-only data is compared with the generated encrypted read-only data. Based on the comparing, it is determined that the received encrypted read-only data matches the generated encrypted read-only data. In response to determining that the received encrypted read-only data differs from the generated encrypted read-only data, the application data is processed.

An aspect combinable with any other aspect includes the following features. To process the application data, the data value is written to the writeable data item stored on the computer-readable database.

An aspect combinable with any other aspect includes the following features. Before writing the data value to the writeable data item stored on the computer-readable database, it is determined that the data value received with the write request satisfies at least one parameter of the writeable data item.

An aspect combinable with any other aspect includes the following features. In response to determining that the data value received with the write request fails to satisfy the at least one parameter of the writeable data item, an error notification is transmitted. The error notification communicates a failure of the data value to satisfy the at least one parameter of the writeable data item.

Certain aspects of the subject matter described here can be implemented as a computer-readable storage medium, e.g., a non-transitory computer-readable storage medium, storing instructions which when executed by one or more processors is configured to perform operations described in this disclosure. Certain aspects of the subject matter described here can be implemented as a computer system that includes one or more processors and a computer-readable storage medium (e.g., a non-transitory computer-readable storage medium) storing instructions which when executed by the one or more processors is configured to perform operations described in this disclosure.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
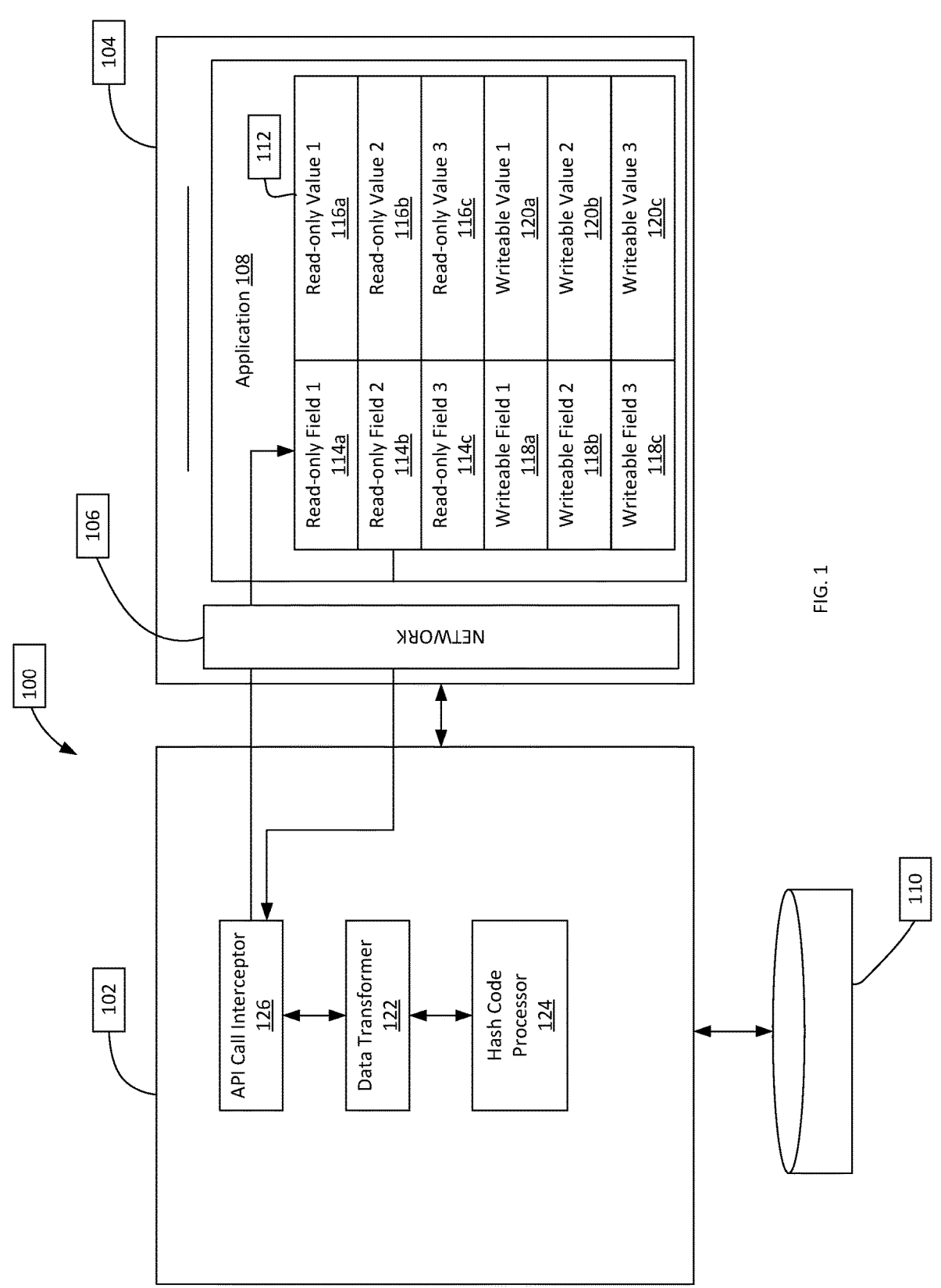
FIG. 1 is a schematic diagram of an example of a client-server computer system environment.

FIG. 1 is a schematic diagram of an example of a client-server computer system environment 100. The client-server computer system environment 100 includes a server computer system 102 (e.g., a backend) operatively connected to a client computer system 104 (e.g., a frontend) via a computer network 106 (e.g., the Internet or other wired or wireless network). The client computer system 104 can execute a computer application 108 (e.g., an Internet browser or other application) with which end users can directly interact. For example, the client computer system 104 can include a display device (not shown) that can display a user interface of the application 108 to the end user. Through the user interface, the end user can exchange data with the server computer system 102, such data transmitted by the network 106. The server computer system 102 can store data that is received from the client computer system 104 (e.g., from the application 108) on a computer-readable database 110 operatively connected to the server computer system 102. In response to requests received from the client computer system 104 (e.g., from the application 108), the server computer system 102 can retrieve data stored in the computer-readable database 110 and transmit the retrieved data to the client computer system 104.

In some instances, the data that the server computer system 102 receives from the application 108 includes read-only data, i.e., data of a type that an end user or the server computer system 102 is not permitted to modify without special permissions. For example, in instances in which the data received from the application 108 is a form with fillable fields, the values of some of the fields in the form can be read-only while the values in other fields in the form can be writeable data, i.e., data of a type that an end user or the server computer system 102 is permitted to modify. The data received from the application 108 includes information identifying the read-only data and writeable data. The server computer system 102 accordingly identifies the read-only data and writeable data stored in the database 110.

In response to a request from the client computer system 104 (e.g., from the application 108), the server computer system 102 can retrieve and transmit data to the client computer system 104. An end user of the application 108 may make modifications to the writeable data and transmit the modified data to the server computer system 102 for persisting (i.e., storing) in the computer-readable database 110. In some instances, a malicious actor (e.g., a hacker) can execute computer code (e.g., code executable by the application 108 such as browser code, or network inspector tools) to intercept the modified data prior to transmission by the client computer system 104, further modify the modified data, and transmit the further modified data to the server computer system 102. In such instances, the end user, who initially modified the data, may be unaware of the further modification by the malicious actor. The server computer system 102 may treat the further modified data as having been received from the end user and store the data. In such instances, integrity of the modified data received by the server computer system 102 can be compromised.

This disclosure describes techniques to check if the data received from the application 108, whether modified or not by an end user, has been modified by an intermediate malicious actor without the knowledge or permission of the end user. To do so, in some implementations, the server computer system 102 identifies read-only data previously received from the application 108 and encrypts the identified read-only data using an encryption mechanism. In response to receiving a request for stored data from the application 108, the server computer system 102 transmits the requested data and the encrypted read-only data. The server computer system 102 receives data from the application 108, the data including the read-only data, which was previously encrypted to generate the encrypted read-only data. The server computer system 102 encrypts the received read-only data using the same encryption mechanism and compares the encrypted (received) read-only data to the encrypted (sent) read-only data. If the encrypted read-only data do not match, then the server computer system 102 transmits an error notification to the client computer system 104.

Implementing the techniques described here can validate data exchanged in a client-server environment against tampering. In this manner, computational data security can be increased. Implementing the techniques described can prevent improper requests to write data to databases from being executed, thereby conserving computational resources. Computational resources can also be conserved when validating the integrity of the data by comparing a single object (e.g., a single UUID/hash value) instead of verifying all individual fields, one at a time. The techniques described here can be implemented to further conserve computational resources by supporting the permissibility of values that can be entered into fields.

In some implementations, the server computer system 102 receives application data from the client computer system 104. Application data includes data received by the application 108 executing on the client computer system 104. For example, the application data can include values inputted into a form 112 with fillable fields. The form 112 can include multiple read-only fields (e.g., read-only fields 114a, 114b, 114c) to which corresponding read-only values (e.g., read-only values 116a, 116b, 116c) are assigned. The form 112 can also include multiple writeable fields (e.g., writeable fields 118a, 118b, 118c) to which corresponding writeable values (e.g., writeable values 120a, 120b, 120c) are assigned. As described earlier, the read-only values cannot be modified, either by an end user of the client computer system 104 or by the server computer system 102, without special permissions, whereas the writeable values can be modified based on input from an end user of the client computer system 104.

The server computer system 102 can store the form 112 (i.e., the fields and assigned values) on the computer-readable database 110. In response to input through the application 108, the client computer system 104 can transmit a request, through the network 106, to the server computer system 102 for the form 112. The server computer system 102 can retrieve the form 112 from the database 110 to transmit to the client computer system 104. Before doing so, the server computer system 102 can encrypt the read-only values assigned to read-only fields in the form 112, and transmit the form 112 including the encrypted read-only values to the client computer system 104.

The server computer system 102 includes a data transformer 122 that can identify the read-only fields from among the multiple fields in the in the form 112. The data transformer 122 can group the multiple read-only fields into a secured object that collectively represents the multiple read-only fields. In this manner, the data transformer 122 can group a collection of read-only values into a single encodable object.

The server computer system 102 includes a hash code processor 124 that is operatively coupled to the data transformer 122. The hash code processor 124 encrypts the secured object by implementing an encryption mechanism (described later) such that the encrypted secured object represents an encryption of the multiple read-only values in the form 112. The hash code processor 124 can attach the encrypted secured object (i.e., generated encrypted read-only data) as secured metadata to the form 112 that is to be transmitted to the client computer system 104. That is, rather than encrypting each read-only value and attaching each encrypted read-only value to the form as respective metadata, the hash code processor 124 can generate a single item of metadata that collectively represents an encryption of all the read-only values in the form 112.

The server computer system 102 includes an application program interface (API) call interceptor 122. The API call interceptor 122 can identify and trace the network (API) calls received from the client computer system 104, specifically the application 108. The API call interceptor 122 can embed (i.e., encode) the encrypted single item of metadata to the form 112, particularly such that the embedded encrypted single item of metadata should be included when the form 112 is returned by the client computer system 104. In this manner, in response to receiving the request from the client computer system 104, the server computer system 102 can transmit the form 122 together with encrypted read-only data that collectively represents an encryption, by an encryption mechanism, of the multiple read-only values stored in the database 110. As described later, the form 112 includes the encrypted metadata when the form 112 is received from the client computer system 104, and the server computer system 102 decodes the encrypted metadata.

Subsequently, the server computer system 102 can receive the form 112, including the encrypted read-only values, from the client computer system 104. Because the read-only values are not modifiable, the read-only values that the server computer system 102 transmitted to the client computer system 104 must match the read-only values that the server computer system 102 receives from the client computer system 104. A mismatch of the read-only values indicates that an actor may have tampered with the form 112 during the transmission from the client computer system 104 to the server computer system 102.

In some implementations, the server computer system 102 can check for a match/mismatch of the read-only values using the encrypted metadata that is included when the form 112 is received from the client computer system 104, the encrypted metadata having been previously embedded to the form 112, as described earlier. The API call interceptor 122 can identify, the transmission received from the client computer system 104, the embedded encrypted metadata as well as the read-only values. The data transformer 122 can group the received read-only values into a secured object in the same manner as described earlier. Also, in the same manner as described earlier, the hash code processor 124 can encrypt the secured object using the same encryption mechanism as described earlier. In this manner, the hash code processor 124 encrypts read-only data using read-only values received from the client computer system 104 (i.e., received encrypted read-only data).

The API call interceptor 126 compares the received encrypted read-only data to the generated encrypted read-only data. Because the received and generated encrypted read-only data were generated using the same encryption mechanism, a match indicates that the underlying read-only values transmitted to the form 112 are the same as the read-only values received from the form 112. Conversely, a mismatch indicates that the received read-only values are different from the transmitted read-only values. Based on a result of the outcome, the API call interceptor 126 can either allow the values in the form 112 to be stored in the database 110 or prevent such action, and instead transmit an error notification.

Figure 2:
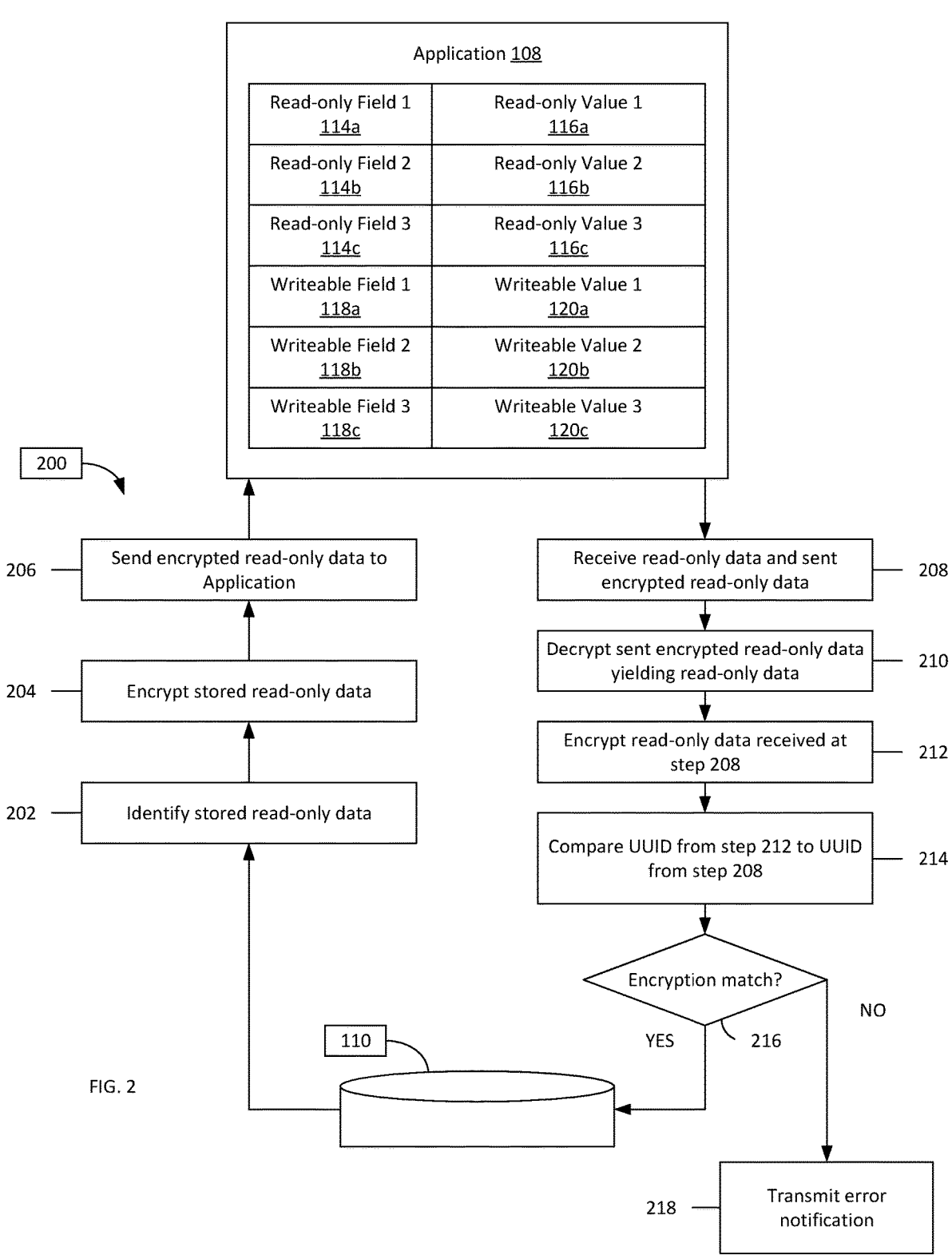
FIG. 2 is a flow diagram of an example of a process of dynamically protecting read-only fields received from a client computer system of the environment of FIG. 1.

FIG. 2 is a flowchart of an example of a process 200 of dynamically protecting read-only fields received from a client computer system of the environment of FIG. 1. The process 200 can be implemented by the server computer system 102 (FIG. 1). In some implementations, the data transformer 122, the hash code processor 124 and the API call interceptor 126 of FIG. 1 can each or together be implemented as a computer system separate from and operatively coupled to the server computer system 102 to implement the process 200. The process 200 begins in response to receiving a request from the application 108 for the form 112 that includes read-only fields/values and writeable fields/values.

At 202, in response to receiving the request the server computer system 102 identifies stored read-only data in the database 110. In some implementations, the API call interceptor 126 intercepts the request from the client computer system 104 (specifically, the application 108). In response to receiving the request, the server computer system 102 can retrieve field/value pairs stored in the database 110 and identify read-only fields and corresponding values from the retrieved field/value pairs. For example, in a form including employee data, "Employee Name" and "Employee ID" can be fields, each having an assigned value. Each of these fields can be read-only. The server computer system 102 can identify values (e.g., "Name" and "1234," respectively) for the identified read-only fields.

At 204, the server computer system 102 can encrypt the identified read-only data. In some implementations, the data transformer 124 can encode the identified read-only fields ("Employee Name" and "Employee ID") and the corresponding read-only values (""Name" and "1234") into a single data object (Data-A). The hash code processor 122 encrypts the data object using an encryption mechanism (e.g., a hash algorithm) and encodes the hash value to the data object, resulting in the data object being obfuscated. In addition, the hash code processor 122 generates a universally unique identifier (UUID-A) for the obfuscated data object. The API call interceptor 126 appends the obfuscated data object, which includes Data-A and UUID-A, as metadata to a response to the request received from the server computer system 102.

At 206, the server computer system 102 can send the encrypted read-only data (including Data-A and UUID-A) to the client computer system 104. For example, the API call interceptor 126 can append the encrypted read-only data as metadata to the fields/values requested by the application 108, and can transmit a payload that includes the fields/values and the encrypted read-only data to the application 108. The API call interceptor 126 can encode the payload such that the encrypted read-only data (including Data-A and UUID-A) is included in any data received from the application 108.

The requested form 112 can include writable fields in addition to the read-only fields described earlier. In response to receiving the requested form 112, the application 108 can display the form 112 (e.g., in a display device). The application 108 can receive input to the writable fields (e.g., values to be assigned to the writeable fields). The application 108 can transmit the form 112, with the writable values, to the server computer system 102 for storage in the database 110. In addition to any writable values, the payload transmitted by the application 108 to the server computer system 102 includes the encrypted read-only data that was previously transmitted to the application 108 at step 206.

At 208, the server computer system 102 receives the read-only data and the sent encrypted read-only data (including Data-A and UUID-A). For example, the API call interceptor 126 intercepts the received data and identifies, from the payload, the encrypted read-only data. Also, the API call interceptor 126 identifies the read-only values in the received payload.

At 210, the server computer system 102 decrypts the sent encrypted read-only data, which was received at step 208, using the decryption mechanism associated with the encryption mechanism implemented at step 204. That is, the server computer system 102 decodes Data-A to retrieve the underlying read-only fields and read-only values. If data integrity has been maintained, doing so should yield the read-only fields "Employee Name" and "Employee ID" and the read-only values "Name" and "1234".

At 212, the server computer system 102 encrypts the read-only data received at step 208 using the same encryption mechanism used at step 204. Specifically, the data transformer 124 encodes the received read-only fields and the corresponding read-only values into a single data object (Data-B). The hash code processor 122 encrypts the data object using the same encryption mechanism as implemented at step 204, resulting in the data object being obfuscated. In addition, the hash code processor 122 generates a universally unique identifier (UUID-B) for the obfuscated data object. If data integrity has been maintained, UUID-A should match UUID-B. Failure to match indicates a loss of data integrity.

At 214, the server computer system 102 compares UUID-A, i.e., the hash of the obfuscated data object generated at step 204, to UUID-B, i.e., the hash of the obfuscated data object generated at step 212. At 216, the server computer system 102 (specifically, the API call interceptor 126) checks for a result of the comparison performed at step 214. If the encryption matches (decision branch "YES"), then the underlying read-only values sent at step 204 match the read-only values received at step 208. In such instances, the API call interceptor 126 permits the received read-only values as well as any received writable values to be stored in the database 110. On the other hand, if the UUIDs do not match (decision branch "NO"), then the read-only values sent at step 204 do not match the read-only values received at step 208. In such instances, the API call interceptor 126 does not permit the received values to be stored in the database 110. Instead, at step 218, the server computer system 102 transmits an error notification, e.g., to the client computer system 104 (specifically to the application 108), an administrator of the server computer system 102, to another computer system operatively coupled to the environment 100 or any combination or all of them. The error notification can notify the recipient of the mismatch between the sent and received read-only values.

In some implementations, the payload received from the application 108 can include writable values to be assigned to writable fields. A writable field is associated with a format that the value assigned to the field must satisfy. For example, a writable field that can only numerical values cannot be assigned a value that includes non-numerical alphanumeric characters. In some implementations, after determining an encryption match at step 214, the server computer system 102 checks each writable value received with the payload against a format associated with the writable field. In response to determining a mismatch between the formats, the server computer system 102 can transmit an error notification to the application 108. In this manner, the server computer system 102 can ensure that values of permissible formats, and not any format, are written to writable fields.

Figure 3:
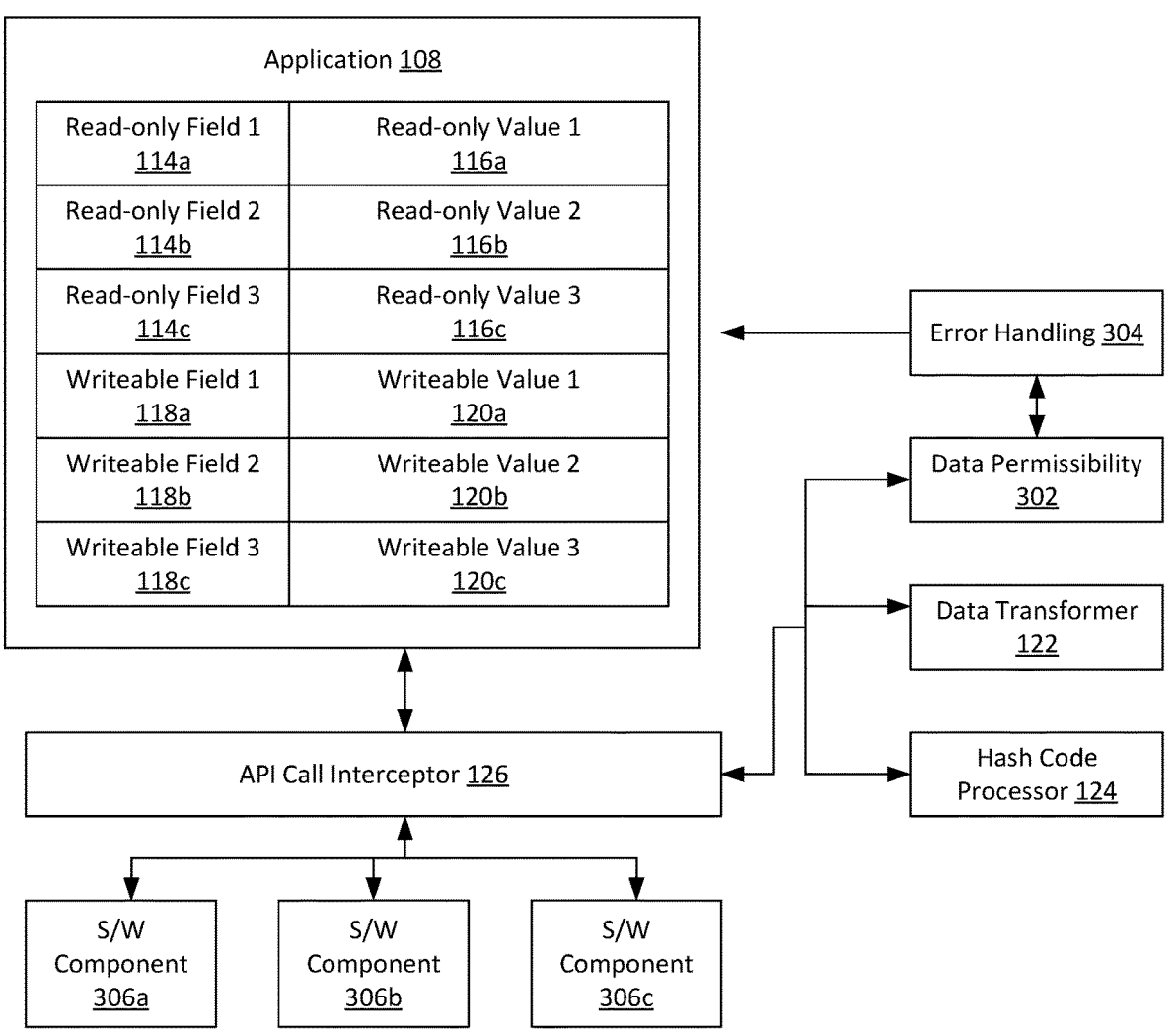
FIG. 3 is a schematic diagram of an example of a scaled-up implementation of the environment of FIG. 1.

FIG. 3 is a schematic diagram of an example of a scaled-up implementation of the environment of FIG. 1. FIG. 3 schematically shows the application 108 executed by the client computer system 102 being operatively connected to multiple software components (e.g., S/W components 306a, 306b, 306c), with each of which the application 108 is exchanging data, for example, the form 112. Each software can include a respective database that stores data. In some implementations, a respective API call interceptor 126, a respective hash code processor 124 and a respective data transfer 122 can be implemented with each software. In some implementations, a common API call interceptor 126, hash code processor 124 and data transfer 122 can be implemented for all of the multiple software. In such implementations, each software can be operatively connected to the common API call interceptor 126, which in turn, is operatively connected to the common data transformer 122 and the common hash code processor 124. Also, in such implementations, a data permissibility 302 can be implemented to check that a received value to be assigned to a writable field has a permissible format. Error notifications and other error handling can be handled by an error handling 304. In such implementations, each of the API call interceptor, data transformer, hash code processor, data permissibility and error handling schematically shown in FIG. 3 can simultaneously perform multiple parallel operations to ensure the integrity of data exchanged between the application and each of the multiple software.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "processor" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well, for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:

receiving, from an application executing on a client computer system connected to a server computer system connected to a computer-readable database, a database write request that includes each of 1) a writable field value for a writeable data item stored on the computer-readable database; 2) a plurality of received read-only field values for a plurality of read-only data items stored on the computer-readable database; and 3) sent encrypted read-only data, wherein the sent encrypted read-only data was previously generated by an encryption mechanism and previously sent to the application;

encrypting the plurality of received read-only field values using the encryption mechanism resulting in received encrypted read-only field data;

comparing the received encrypted read-only field data with the sent encrypted read-only data;

determining, based on the comparing, whether the received encrypted read-only field data differs from the sent encrypted read-only data;

in response to determining that the received encrypted read-only field data matches the sent encrypted read-only data, processing the database write request; and in response to determining that the received encrypted read-only field data differs from the sent encrypted read-only field data:

automatically rejecting the database write request; and transmitting an error notification to the application.

2. The method of claim 1, further comprising, before receiving the database write request, generating the sent encrypted read-only data by:

identifying, from the computer-readable database, the plurality of read-only data items;

identifying a plurality of stored read-only data values for the plurality of read-only data items; and encrypting the plurality of stored read-only data values using the encryption mechanism.

3. The method of claim 2, further comprising:

receiving, from the application, a read request; and in response to receiving the read request, transmitting the plurality of stored read-only data values and the sent encrypted read-only data to the client computer system.

4. The method of claim 2, wherein encrypting the plurality of stored read-only data values using the encryption mechanism comprises:

attaching, to the plurality of stored read-only data values, a universally unique identifier (UUID);

determining, for the plurality of stored read-only data values and the UUID, a hash value;

generating a secured object including the plurality of stored read-only data values, the UUID and the hash value; and encoding the secured object to generate an obfuscated data object.

5. The method of claim 1, wherein processing the database write request comprises writing the writable field value to the writeable data item stored on the computer-readable database.

6. The method of claim 5, wherein processing the database write request comprises, before writing the writable field value to the writeable data item stored on the computer-readable database, determining that the writable field value received with the database write request satisfies at least one parameter of the writeable data item.

7. The method of claim 6, further comprising, in response to determining that the writable field value received with the database write request fails to satisfy the at least one parameter of the writeable data item, transmitting an error notification communicating a failure of the writable field value to satisfy the at least one parameter of the writeable data item.

8. A non-transitory computer-readable storage medium storing computer instructions which when executed by one or more processors is configured to perform operations comprising:

receiving, from an application executing on a client computer system connected to a server computer system connected to a computer-readable database, a database write request that includes each of 1) a writable field value for a writeable data item stored on the computer-readable database; 2) a plurality of received read-only field values for a plurality of read-only data items stored on the computer-readable database; and 3) sent encrypted read-only data, wherein the sent encrypted read-only data was previously generated by an encryption mechanism and previously sent to the application;

encrypting the plurality of received read-only field values using the encryption mechanism resulting in received encrypted read-only field data;

comparing the received encrypted read-only field data with the sent encrypted read-only data;

determining, based on the comparing, whether the received encrypted read-only field data differs from the sent encrypted read-only data;

in response to determining that the received encrypted read-only field data matches the sent encrypted read-only data, processing the database write request; and in response to determining that the received encrypted read-only field data differs from the sent encrypted read-only field data:

automatically rejecting the database write request; and transmitting an error notification to the application.

9. The medium of claim 8, the operations further comprising, before receiving the database write request, generating the sent encrypted read-only data by:

identifying, from the computer-readable database, the plurality of read-only data items;

identifying a plurality of stored read-only data values for the plurality of read-only data items; and encrypting the plurality of stored read-only data values using the encryption mechanism.

10. The medium of claim 9, the operations further comprising:

receiving, from the application, a read request; and in response to receiving the read request, transmitting the plurality of stored read-only data values and the sent encrypted read-only data to the client computer system.

11. The medium of claim 9, wherein encrypting the plurality of stored read-only data values using the encryption mechanism comprises:

attaching, to the plurality of stored read-only data values, a universally unique identifier (UUID);

determining, for the plurality of stored read-only data values and the UUID, a hash value;

generating a secured object including the plurality of stored read-only data values, the UUID and the hash value; and encoding the secured object to generate an obfuscated data object.

12. The medium of claim 8, wherein processing the database write request comprises writing the writable field value to the writeable data item stored on the computer-readable database.

13. The medium of claim 12, wherein processing the database write request comprises, before writing the writable field value to the writeable data item stored on the computer-readable database, determining that the writable field value received with the database write request satisfies at least one parameter of the writeable data item.

14. The medium of claim 13, the operations further comprising, in response to determining that the writable field value received with the database write request fails to satisfy the at least one parameter of the writeable data item, transmitting an error notification communicating a failure of the writable field value to satisfy the at least one parameter of the writeable data item.

15. A computer system comprising:

one or more processors; and a computer-readable storage medium storing instructions which when executed by the one or more processors is configured to perform operations comprising:

receiving, from an application executing on a client computer system connected to a server computer system connected to a computer-readable database, a database write request that includes each of 1) a writable field value for a writeable data item stored on the computer-readable database; 2) a plurality of received read-only field values for a plurality of read-only data items stored on the computer-readable database; and 3) first sent encrypted read-only data, wherein the sent encrypted read-only data was previously generated by an encryption mechanism and previously sent to the application;

encrypting the plurality of received read-only field values using the encryption mechanism resulting in received encrypted read-only field data values;

comparing the received encrypted read-only field data values with the first sent encrypted read-only data;

determining, based on the comparing, whether the received encrypted read-only field data values differs from the first sent encrypted read-only data;

in response to determining that the received encrypted read-only field data values matches the first sent encrypted read-only data, processing the database write request; and in response to determining that the received encrypted read-only field data values differs from the first sent encrypted read-only field data:

automatically rejecting the database write request; and transmitting an error notification to the application.

16. The computer system of claim 15, the operations further comprising, before receiving the database write request, generating the sent encrypted read-only data by:

identifying, from the computer-readable database, the plurality of read-only data items;

identifying a plurality of stored read-only data values for the plurality of read-only data items; and encrypting the plurality of stored read-only data values using the encryption mechanism.

* * * * *